United States Patent
Huang et al.

(10) Patent No.: US 9,614,364 B2
(45) Date of Patent: Apr. 4, 2017

(54) DETECTION SYSTEM AND DETECTION METHOD OF DISTRIBUTED GENERATION ISLANDING BASED ON POWER FREQUENCY CARRIER

(75) Inventors: Biyao Huang, Beijing (CN); Jianqi Li, Beijing (CN); Guojun Liu, Beijing (CN); Zhihui Wang, Beijing (CN); Nan Quan, Beijing (CN); Xiaofeng Qu, Beijing (CN); Tao Zhao, Beijing (CN); Licheng Wang, Beijing (CN)

(73) Assignees: STATE GRID CORPORATION OF CHINA, Beijing (CN); China Electric Power Research Institute, Beijing (CN)

(*) Notice: Subject to any disclaimer, the term of this patent is extended or adjusted under 35 U.S.C. 154(b) by 993 days.

(21) Appl. No.: 13/885,686

(22) PCT Filed: Oct. 31, 2011

(86) PCT No.: PCT/CN2011/001818
§ 371 (c)(1),
(2), (4) Date: Jul. 17, 2013

(87) PCT Pub. No.: WO2012/065359
PCT Pub. Date: May 24, 2012

(65) Prior Publication Data
US 2014/0146427 A1 May 29, 2014

(30) Foreign Application Priority Data
Nov. 17, 2010 (CN) .......................... 2010 1 0547452

(51) Int. Cl.
*H02J 3/08* (2006.01)
*H02H 3/38* (2006.01)
(Continued)

(52) U.S. Cl.
CPC ............ *H02H 3/38* (2013.01); *H02H 1/0061* (2013.01); *H02H 7/28* (2013.01); *H02J 3/38* (2013.01);
(Continued)

(58) Field of Classification Search
CPC ........ H02J 3/08; H02J 3/40; H02J 3/42; H02J 3/44; H02J 9/06
(Continued)

(56) References Cited

U.S. PATENT DOCUMENTS 6,188,145 B1 * 2/2001 Stewart .................. G01R 11/02
307/125
2006/0004531 A1 * 1/2006 Ye ...................... G01R 19/2513
702/60

FOREIGN PATENT DOCUMENTS

CN 101123349 A * 2/2008

* cited by examiner

*Primary Examiner* — Joseph Inge
(74) *Attorney, Agent, or Firm* — Platinum Intellectual Property LLP (57) ABSTRACT

A detection system of distributed generation islanding based on power frequency carrier, the detection system comprising: a power frequency carrier signal generating device; a power frequency carrier signal detection device; a signal coupling transformer; a substation bus; a distribution power generator (DG); and a safety isolation breaker, wherein the power frequency carrier signal generating device comprises a voltage and current monitor circuit, the power frequency carrier signal generating device is connected with the signal coupling transformer through four three phase four line power cables, and the signal coupling transformer is connected with substation bus through 3 power cables.

10 Claims, 8 Drawing Sheets

(51) Int. Cl.
*H02H 1/00* (2006.01)
*H02H 7/28* (2006.01)
*H02J 3/38* (2006.01)
*H02J 13/00* (2006.01)

(52) U.S. Cl.
CPC ..... *H02J 13/0051* (2013.01); *H02J 2003/388* (2013.01); *Y02B 90/263* (2013.01); *Y02E 40/72* (2013.01); *Y02E 60/723* (2013.01); *Y02E 60/725* (2013.01); *Y02E 60/783* (2013.01); *Y02P 80/14* (2015.11); *Y04S 10/12* (2013.01); *Y04S 10/16* (2013.01); *Y04S 10/20* (2013.01); *Y04S 40/123* (2013.01)

(58) Field of Classification Search
USPC .......................................................... 307/87
See application file for complete search history.

DETECTION SYSTEM AND DETECTION METHOD OF DISTRIBUTED GENERATION ISLANDING BASED ON POWER FREQUENCY CARRIER

CLAIM OF PRIORITY

This present application claims the benefit of priority to PCT Application No. PCT/CN2011/001818, filed Oct. 31, 2011, all of which application are incorporated herein by reference in their entirety.

TECHNICAL FIELD

The present invention relates to a detection system and detection method of distributed generation islanding based on power frequency carrier, which belongs to electric power systems automation technology field.

BACKGROUND OF INVENTION

The so-called island is when the power grid accident happened or power paused for reparation, the user end of distributed generation system did not cut from the connected power grid, resulting in distribution generation and forming a self-contained power supply system with surrounding loads. The island includes planed island and non-planned island. In the planed island, the power of distributed generation can still continue to run after the main network outage, and supply power for a part of important loads. While in the planed island power supply must be stopped to the loads after the main network power off. Islanding detection is one of the key technical to solve the "grid-connection difficulty" of distributed generation. the accuracy of detection is the prerequisite of smooth handover between distributed generation grid-connected and islanded operation, is the basic condition to carry out the microgrid energy management system.

At present, the islanding detection method mainly includes local detection method based on local electrical quantities (these electrical quantities including frequency, voltage, harmonic, impedance and so on) and the remote detection method based on remote communication technology. The local detection is divided into passive detection and active detection methods. Passive detection method has inevitable detection zone in distributed generation system while the active detection method has reliability and interference problems. Detection cost will be pulled highly by making use of both methods synthetically. The remote detection method must real-time monitor switch status of the grid, tripping signal. this method relies on the support of communication network. The construction cost of communication network is a key obstacle. Moreover, another difficulty of the remote detection method is the random changes of distribution network topology.

With construction of the smart grid, there will be large distributed power demand in the distribution network. In the future, the distributed generation and microgrids will be applied popularly in china.

SUMMARY OF THE INVENTION

The aim of this present invention is: to meet distributed power demand in low voltage distribution network, and provide a practical and efficient distributed generation islanding detection method, and solve some key technical problems for the intelligent and automation development of electric power systems.

In order to realize the aim, the present invention disclose a power frequency carrier technology to carry out the islanding detection of distributed generation and Microgrid according to the basic characteristics of power distribution network in china. The devices of the system relate to the system with power frequency carrier signal generating device and power frequency carrier signal detection device. The present invention provides an effective method for islanding signal detection of distributed generation and micro-grid signal, anti-islanding protection. There is very high technical and economic performance applying the distribution network under high permeability condition.

This present invention provides a detection system of distributed generation islanding based on power frequency carrier. The system includes power frequency carrier signal generating device, power frequency carrier signal detection device, signal coupling transformer, substation bus, distribution power generator (DG) and safety isolation breaker. Said power frequency carrier signal generating device contains the voltage and current monitor circuit. Said power frequency carrier signal generating device is connected with said signal coupling transformer through four three phase four line power cables. Said signal coupling transformer is connected with substation bus through three power cables. Substation bus is connected with 10 kV/400V substation and the safety isolation breaker through feeder. The power frequency carrier signal detection device is installed between the safety isolation breaker and the DG. The power frequency carrier signal detection device is connected with the lower voltage power network though phase A, B and C live wires and the N middle wire, or through one of the phase A, B and C live wires and the N middle wire to detect signal. The power frequency carrier signal detection device contains signal hardware synthesis circuit. The power frequency carrier signal generating device sends one signal at a frequency cycle, if the power frequency carrier signal detection device doesn't detect signal within five continue frequency cycles, the connection between substation bus and the DG will break off, the power frequency carrier signal detection device send immediately tripping signal to safety isolation breaker triple, and ensure the DG (5) isolate from the major network.

Wherein, the power frequency carrier signal generating device is connected with said signal coupling transformer though phase A, B C live wires and the N middle wire, that results in the signal can be send by anyone signal phase, any two phases parallel way or three phases parallel way.

Wherein, the power frequency carrier signal generating device is connected with said signal coupling transformer though phase A, B C live wires and the N middle wire, or through one of the phase A, B and C live wires and the N middle wire.

Wherein, the power frequency carrier signal detection device contains hardware signal synthesis circuit and the hardware signal synthesis circuit includes 3 voltage transformers. The first voltage transformer, the second voltage transformer and the third voltage transformer complete the signal strength transformation, and the transformation ratio of the first and the second voltage transformer are same, and transformation ratio of the third voltage transformer is 1.732 times of the first voltage transformer.

Wherein, the high voltage side of the signal coupling transformer that is 10 kV side is connected with the substation bus through 3 high-voltage fuses. The low voltage side of the signal coupling transformer that is 400V side is connected with the power frequency carrier signal generating device through 3 molded case circuit breakers, the power frequency carrier signal generating device exchanges information with the remote control system through communication interface.

This present invention provides a detection method using above detection system. The power frequency carrier signal is sent by said power frequency carrier signal generating device and coupled to the substation bus by the signal coupling transformer. The signal is transformed though medium power network, distribution transformer and low voltage power network, to monitor the power frequency carrier signal by the real-time monitoring of power carrier signal detection device installed in the distributed generation.

Wherein, it uses self-monitor transmit power method to control the peak of the transmit current of power frequency carrier signal greater than 300 A and less than 600 A.

Wherein, the power frequency carrier signal generating device sends the carrier signal to substation bus by the signal coupling transformer, the capacity of the signal coupling transformer is from 200 kVA to 600 kVA, and the signal detection period is 40 ms, and the effective range of the signal is 6 ms.

Wherein, the power frequency carrier signal detection device is installed the distribution generating side of the safety isolation breaker, the signal detection period is 40 ms of the signal detection device, if it didn't detect signal within 200 ms continuously, the safety isolation breaker will send tripping signal.

Wherein, the power frequency carrier signal generating device can monitor transmission signal voltage and current, and adjust transmission power itself to ensure the driving signal point is less 30 electrical degrees before crossing zero from positive to negative of the voltage of power frequency, that is 3.33 ms.

Wherein, the power frequency carrier signal detection device contains hardware synthesis circuit; the circuit adopts RC full bridge all-pass filter circuit, there is no effective frequency loss of the signal, and it strengthen the signal receiving energy double.

Wherein, the power frequency carrier signal detection device makes the safety isolation breaker triple by outputting tripping signal; when the tripping signal line is shorter, less than 10 m, it can adopt plus output, and when longer than 10 m it will adopt bus communication.

Wherein, the distribution generation includes photovoltaic power, small wind power and energy storage power generation.

Compared with the prior art, the advantages of this present invention are described as below:

1. The present invention system and its detection method have no islanding detection blind zone.

2. The present invention system and its detection method are not affected by grid-connected energy conversion technology, and suitable for grid-connected inverter and induction generator etc.

3. The penetration of the present invention system and its detection method is higher, the economic performance is better. It has broad application prospects.

DETAILED DESCRIPTION OF THE PREFERRED EMBODIMENTS

The details of the embodiments are described as below incorporated with the figures.

Figure 1:
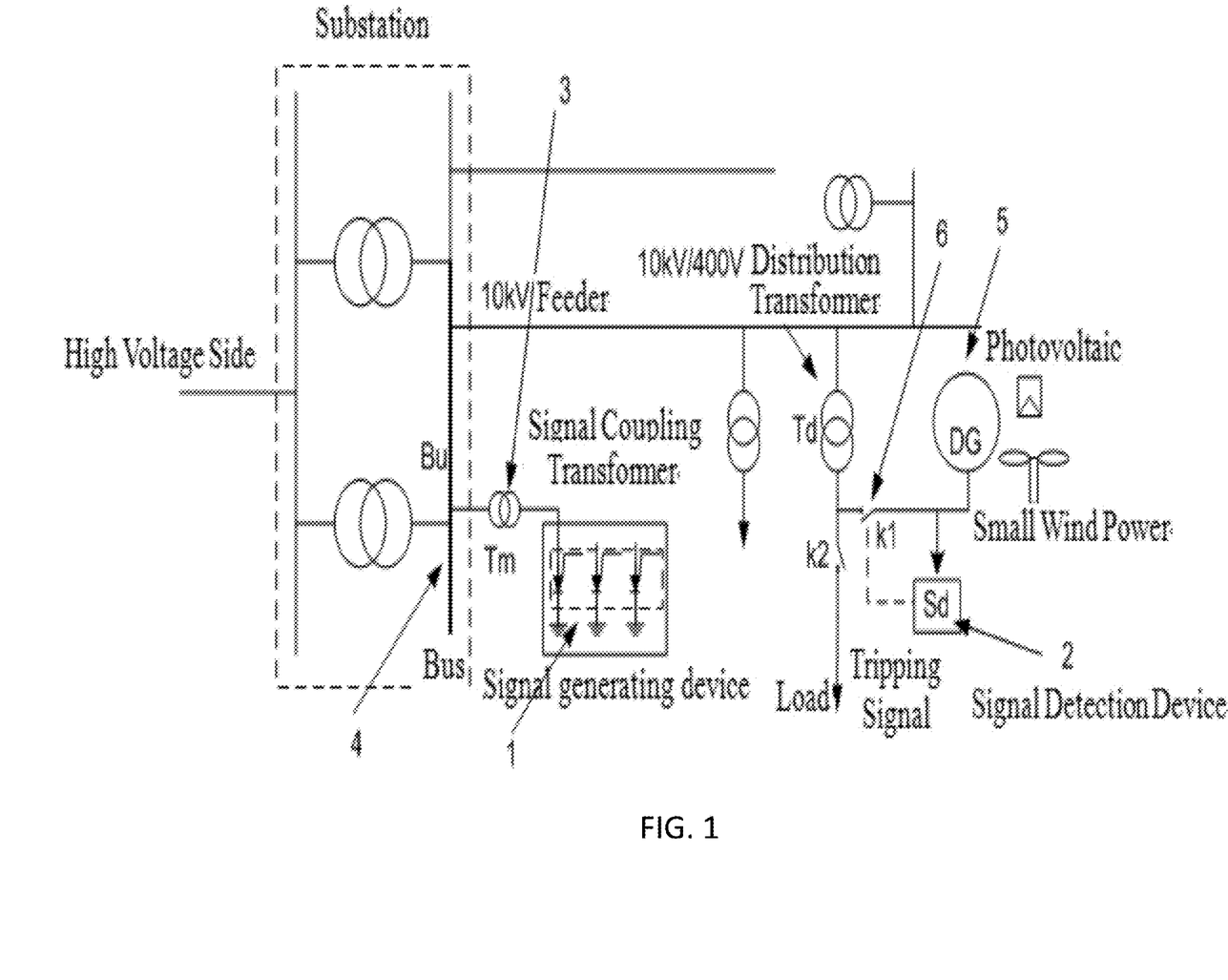
FIG. 1 is schematic diagram of the present invention system and its detection method system.

FIG. 1 is schematic diagram of the present invention system and its detection method system. The present invention relates to a detection system and detection method of distributed generation islanding based on power frequency carrier. The system mainly comprises a power frequency carrier signal generating device 1 near the terminal power distribution substation, a power frequency carrier signal detection device 2 in distributed power grid. The power frequency carrier signal generating device 1 is connected to the substation bus 4 through a signal coupling transformer 3. The power frequency carrier signal generating device sends a signal every frequency cycle 40 ms, and the effective signal lasts 6 ms. The signal detection cycle time of the power frequency carrier signal detection device 2 is 40 ms. If it didn't detect signal in 5 consecutive cycles that is 200 ms, it can be determined that the connecting between the grid connection substation bus 4 and the distributed generation 5 is disconnection. The signal detection device 2 will immediately send the trip signal make the distributed power grid safety isolation breaker 6 trip, and the distributed generation 5 isolates from the major network.

Figure 2:
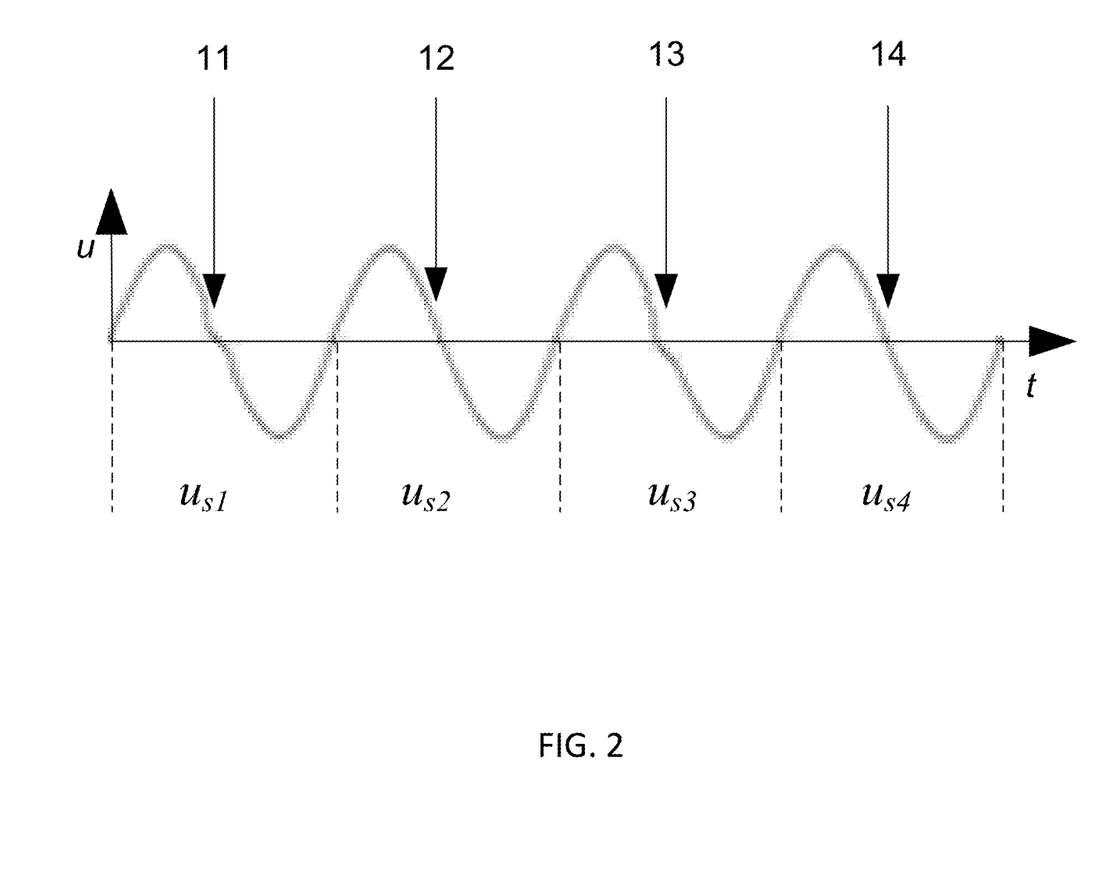
FIG. 2 is the schematic diagram of power frequency carrier signal transmitting waveform.

FIG. 2 is the schematic diagram of power frequency carrier signal transmitting waveform. There are four voltage cycles totally in this diagram. Each two voltage cycles is one signal modulation period that is 40 ms. The single-phase thyristor beaks over one time at a voltage cycle, whose voltage is from positive to negative, and less 30 electrical degrees before crossing zero. In this figure, the position 11 and 13 are the signal modulation positions while the 12 and 14 are not modulation positions. The signal detection device detects the signal distortion at the low voltage side of the transformer of the distribution generation. Detecting signal, the two cycles before and after cycle signals will subtract, that is the signals will be experience the difference operation after the D/A conversion, and extract the transient modulation signal. One signal needs to recognize two power frequency cycles, so it requires 40 ms at least to complete a power frequency distortion signal recognition.

Figure 3:
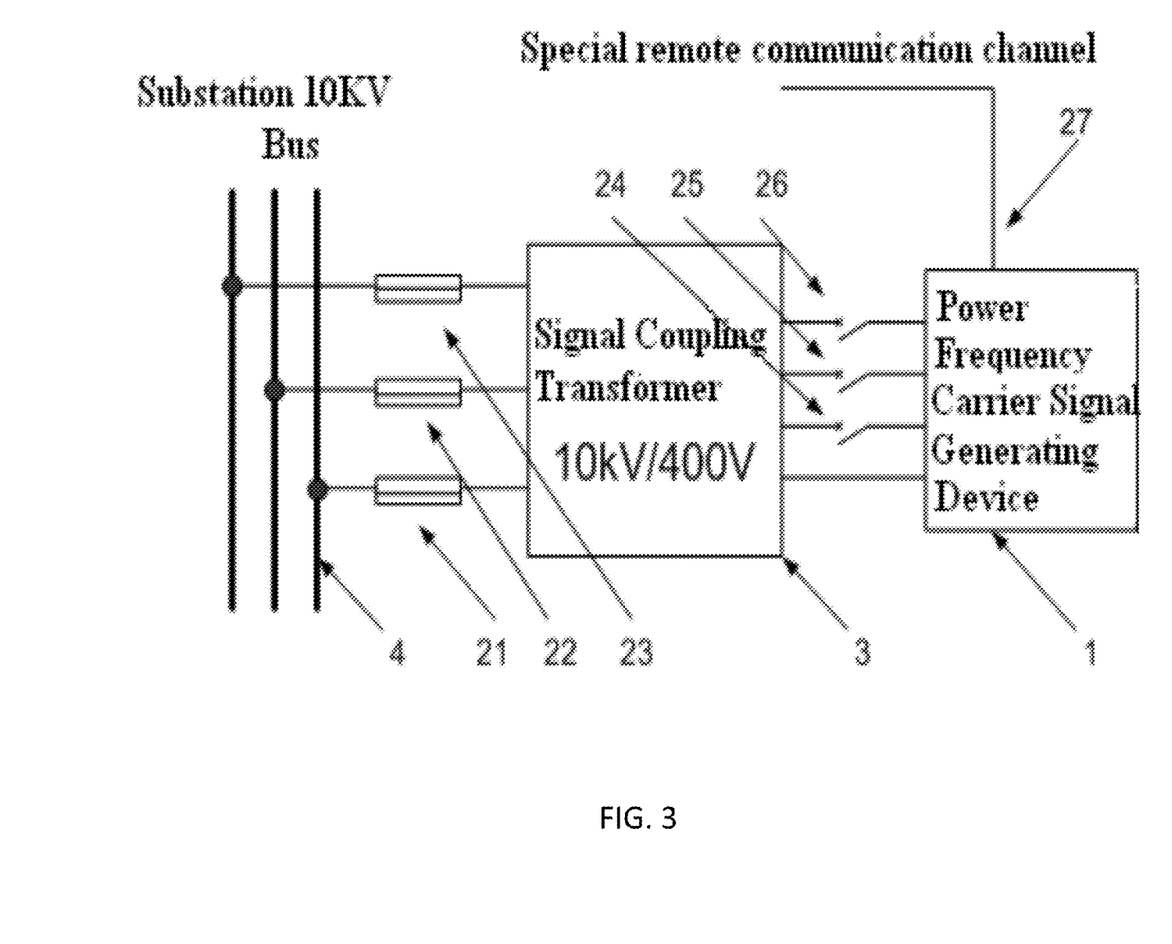
FIG. 3 is the connection schematic diagram between power frequency carrier signal generating device and the signal coupling transformer.

FIG. 3 is the connection schematic diagram between power frequency carrier signal generating device and the signal coupling transformer. The high voltage side of the signal coupling transformer 3 that is 10 kV side is connected with the substation bus 4 through 3 high-voltage fuses 21, 22 and 23. The low voltage side of the signal coupling transformer 3 that is 400V side is connected with the power frequency carrier signal generating device 1 through tree molded case circuit breakers 24, 25 and 26. The power frequency carrier signal generating device exchanges information with the remote control system through communication interface 27. The information includes system start, stop, alarm signal of signal generating device and so on. Remote control communication channel can choose a variety of means of communication, but communication delay must keep constant. The power frequency carrier signal generating device 1 is connected with said signal coupling transformer 3 though phase A, B, C live wires and the N middle wire, that results in the signal can be send by anyone signal phase, any two phases parallel way or three phases parallel way.

Figure 4:
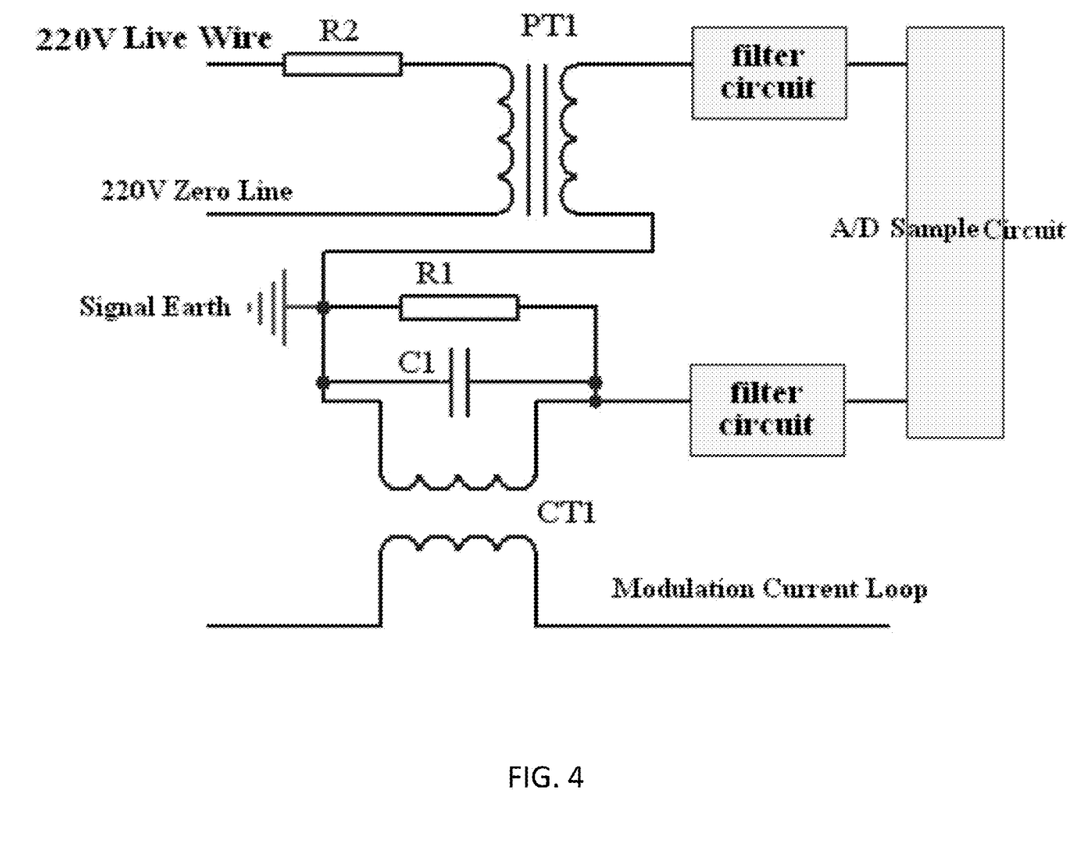
FIG. 4 is the schematic diagram of voltage and current detection circuit.

The power frequency carrier signal generating device 1 contains voltage and current monitor circuit, as FIG. 4 shown. The modulation current loop is connected to the primary side of the current transformator CT1, and the transformation ratio of CT1 is 1:1. The secondary side of the current transformator CT1 is connected with the capacitor C1 and resistor R1. The one end of the capacitor C1 and the resistor R1 connected in parallel is connected with the earth, and another end is connected with A/D sample circuit directly by the filter circuit to monitor modulation current signal of the power frequency carrier signal generating device 1. The primary end of the voltage transformator PT1 is connected with 220V zero line, and another end is connected with 220V live wire by the resistor R2. The secondary end of the voltage transformator PT1 is connected with signal earth, another end is connected with A/D sample circuit directly by the filter circuit to monitor modulation voltage signal of the power frequency carrier signal generating device 1. The filter circuit adopts common active low pass filter circuit in this monitor circuit, and its cut-off frequency is 5 kHz. The ND sample circuit is integrated microprocessor A/D converter, and the resistance of R2 is 110 k, and the resistance of R1 is 51Ω, capacitance of C1 is 0.01 uf. The advantages of this monitor circuit include that fewer elements, higher reliability, and effective signal modulation power control for the power frequency signal generating device.

Figure 5:
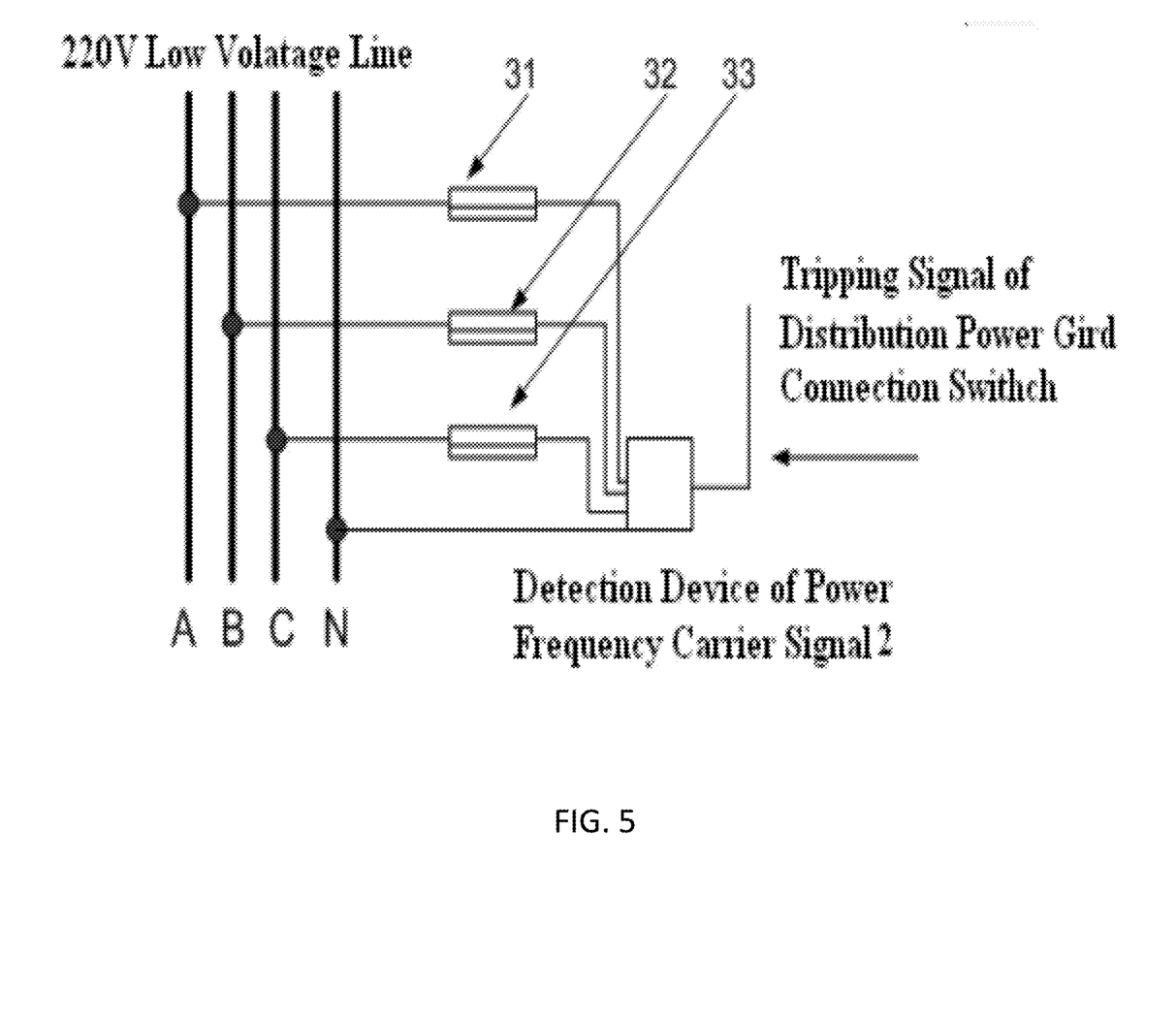
FIG. 5 is the connection schematic diagram of power frequency carrier signal detection device.

FIG. 5 is the connection schematic diagram of power frequency carrier signal detection device. The power frequency carrier signal detection device is connected with signal coupling transformer though phase A, B and C live wires and the N middle wire, and the each phase wire is connected in series separately with 31, 32, and 33 three low voltage fuses, or connected with lower voltage power network through one of the phase A, B and C live wires and the N middle wire to detect signal. The power frequency carrier signal detection device makes the safety isolation breaker trip by outputting tripling signal. When the tripping signal line is shorter, less than 10 m, it can adopt plus output, and when longer than 10 m it will adopt bus communication.

Figure 6:
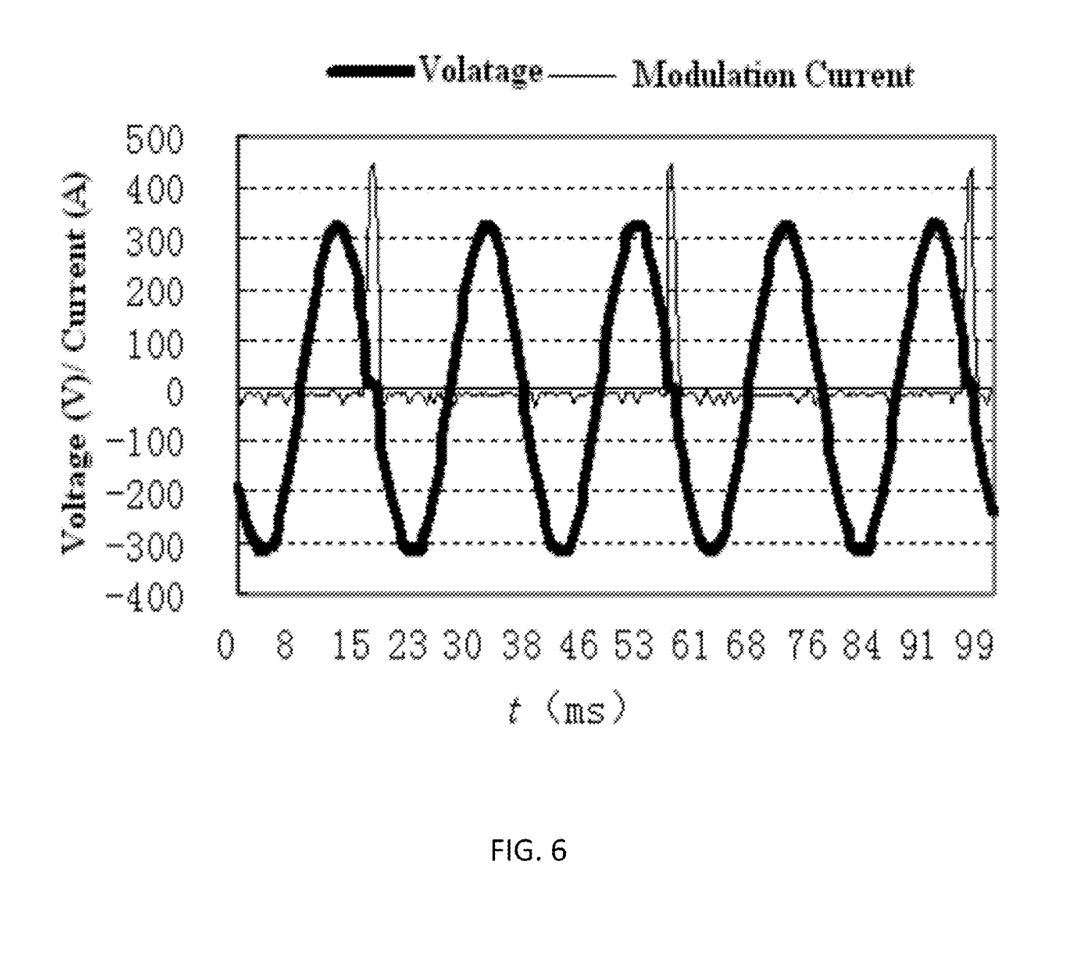
FIG. 6 is diagram of the power frequency carrier signal transmitting current waveform.

FIG. 6 is diagram of the power frequency carrier signal transmitting current waveform. The current peak is 420 A that is greater than 300 A and less than 600 A, and the last time is less than 6 ms.

Figure 7:
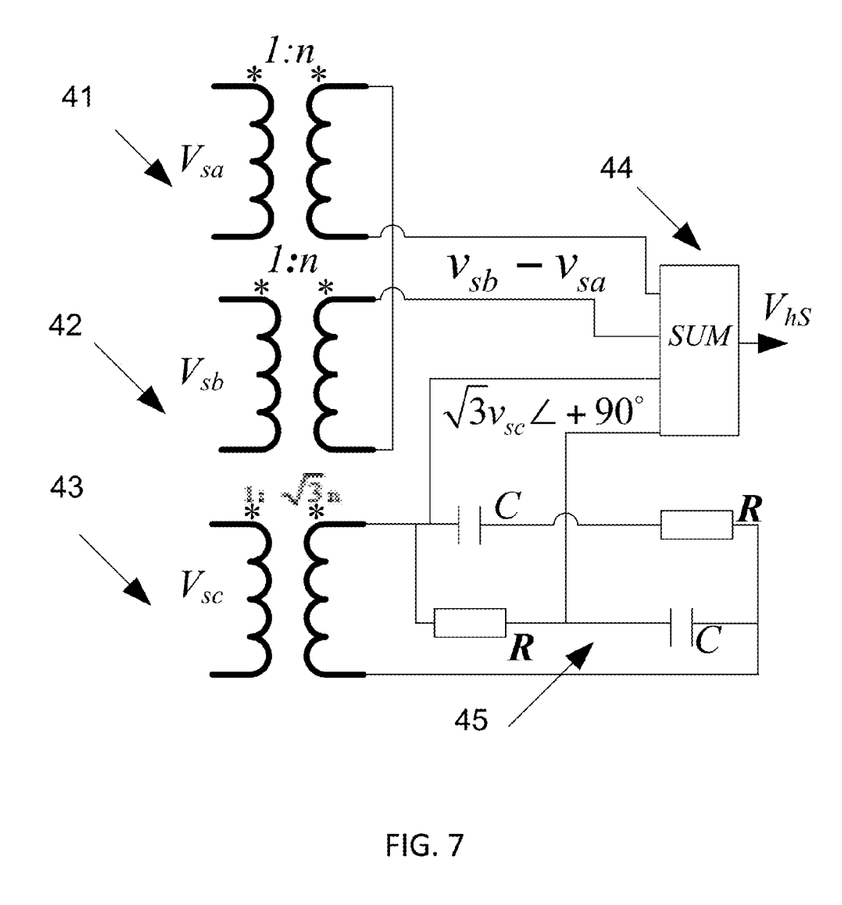
FIG. 7 is the schematic diagram of signal synthesis hardware circuit of power frequency carrier signal detecting device.

FIG. 7 is the schematic diagram of signal synthesis hardware circuit of power frequency carrier signal detecting device. The hardware signal synthesis circuit includes 3 voltage transformers 41, 42 and 43 to complete the signal strength transformation, and the transformation ratio of 41 and 42 are same, and transformation ratio of 43 is 1.732 times that of voltage transformers 41. In figure, 45 is a full bridge filter circuit that composes of two equal capacitors C and two same resistors R. The temperature coefficient of the capacitors and the resistors is small, the circuit works steadily. When the design is satisfied the RC=1/w=1/314, the signal intensity detected by the power frequency carrier signal detection device will strength one times after passing through the hardware adder 44.

Figure 8:
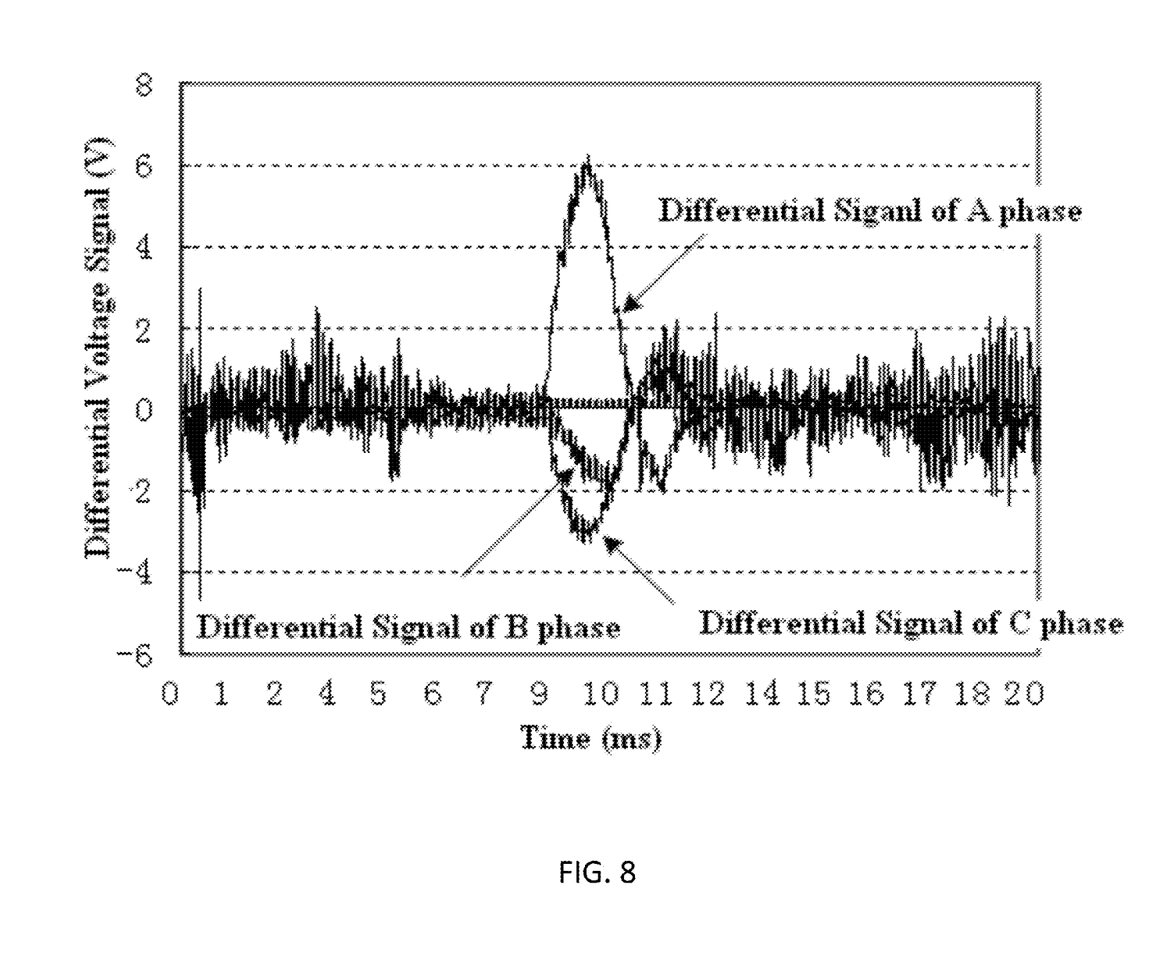
FIG. 8 is the original signal diagram before signal synthesis hardware circuit.

FIG. 8 is the original signal diagram before signal synthesis hardware circuit. The diagram showed the domain waveform of the low voltage side of transformer of the distribution power grid when the power frequency signal is at A modulation phase position. The signal is original signal before being processed by power frequency carrier signal detection device. There are all signal at A phase, B phase and C phase. The waveform is the former and the later voltage cycles difference voltage wave. The voltage fluctuation (voltage notch) peak is 6V, it is less than 20% of the phase voltage peak, and so it will not cause voltage flicker, and will not affect the power quality when the device works.

At last, in this description of the embodiments, we have detail describe the present invention according to a particular example. The detail embodiment is one example of the invention but not the only one, so the person in this field must be understand that all the alternatives and other equal and/or similar examples are all within the range of the invention and they are all consistent with the spirits of this invention, are all protected by our claims.

What is claimed is:

1. A detection system of distributed generation islanding based on power frequency carrier, the detection system comprising:
   a power frequency carrier signal generating device (1),
   a power frequency carrier signal detection device (2),
   a signal coupling transformer (3),
   a substation bus (4),
   a distribution power generator (DG) (5) and
   a safety isolation breaker (6),
   wherein said power frequency carrier signal generating device comprises a voltage and current monitor circuit, the power frequency carrier signal generating device (1) is connected with said signal coupling transformer (3) through four three phase four line power cables, said signal coupling transformer (3) is connected with substation bus (4) through 3 power cables, wherein said substation bus (4) is connected with 10kV/400V substation and the safety isolation breaker (6) through feeder;
   wherein the power frequency carrier signal detection device (2) is installed between the safety isolation breaker (6) and the DG (5), wherein the power frequency carrier signal detection device (2) is connected with the lower voltage power network though phase A, B and C live wires and the N middle wire, or through one of the phase A, B and C live wires and the N middle wire to detect signal;
   wherein the power frequency carrier signal generating device (1) sends one signal at a frequency cycle when the power frequency carrier signal detection device (2) does not detect signal within five continue frequency cycles, the connection between substation bus (4) and the DG (5) will be turned off,
   wherein the power frequency carrier signal detection device (2) sends a tripping signal to the safety isolation breaker (6) triple to ensure the DG (5) isolate from a major network;
   wherein the power frequency carrier signal generating device is connected with said signal coupling transformer though phase A, B C live wires and the N middle wire so that the signal can be send by anyone signal phase, any two phases parallel way or three phases parallel way;

wherein the power frequency carrier signal generating device is connected with said signal coupling transformer though phase A, B, C live wires and the N middle wire, or through one of the phase A, B and C live wires and the N middle wire; and wherein the power frequency carrier signal detection device contains a hardware signal synthesis circuit, and the hardware signal synthesis circuit includes 3 voltage transformers: the first voltage transformer (41), the second voltage transformer (42) and the third voltage transformer (43), and the transformation ratio of the first and the second voltage transformer are same.

2. The detection system of claim 1, which is characterized in that: a high voltage side of a signal coupling transformer (3) that is 10 kV side which is connected with a substation bus through 3 high-voltage fuses (21, 22, 23), a low voltage side of the signal coupling transformer (3) that is 400V side is connected with a power frequency carrier signal generating device through 3 molded case circuit breakers (24, 25, 26), the power frequency carrier signal generating device exchanges information with a remote control system through communication interface (27).

3. The detection system of claim 1, which is characterized in that: a power frequency carrier signal is sent by said power frequency carrier signal generating device and coupled to the substation bus by the signal coupling transformer, the signal is transformed though medium power network, distribution transformer and low voltage power network, to monitor the power frequency carrier signal by real-time monitoring of power carrier signal detection device installed in the distributed generation.

4. The detection system of claim 3, which is characterized in that: it uses self-monitor transmit power method to control a peak of a transmit current of power frequency carrier signal greater than 300 A and less than 600 A.

5. The detection system of claim 4, which is characterized in that: a power frequency carrier signal generating device sends the carrier signal to substation bus by the signal coupling transformer, a capacity of the signal coupling transformer is from 200 kVA to 600 kVA, and the signal detection period is 40 ms, and an effective range of the signal is 6 ms.

6. The detection system of claim 5, which is characterized in that: a power frequency carrier signal detection device is installed the distribution generating side of a safety isolation breaker, the signal detection period is 40 ms of a signal detection device, if it didn't detect signal within 200 ms continuously, the safety isolation breaker will send tripping signal.

7. The detection system of claim 6, which is characterized in that: the power frequency carrier signal generating device monitors transmission signal voltage and current, and adjust transmission power itself to ensure a driving signal point being less 30 electrical degrees before crossing zero from positive to negative of a voltage of power frequency, that is 3.33 ms.

8. The detection system of claim 7, which is characterized in that: the power frequency carrier signal detection device contains hardware synthesis circuit; the circuit adopts RC full bridge all-pass filter circuit, there is no effective frequency loss of the signal, and it strengthen the signal receiving energy double.

9. The detection system of claim 8, which is characterized in that: the power frequency carrier signal detection device makes a safety isolation breaker trip by outputting tripping signal; when a tripping signal line is shorter, less than 10 m, it can adopt plus output, and when longer than 10 m it will adopt bus communication.

10. The detection system of claim 9, which is characterized in that: the distribution generation includes photovoltaic power, small wind power and energy storage power generation.

* * * * *